US007702902B2

(12) United States Patent
Thayer et al.

(10) Patent No.: US 7,702,902 B2
(45) Date of Patent: *Apr. 20, 2010

(54) METHOD FOR A WEB SITE WITH A PROXY DOMAIN NAME REGISTRATION TO RECEIVE A SECURE SOCKET LAYER CERTIFICATE

(75) Inventors: Wayne Thayer, Phoenix, AZ (US); Kevin Reilly, Scottsdale, AZ (US); Justin Jilg, Mesa, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 1119 days.

This patent is subject to a terminal disclaimer.

(21) Appl. No.: 10/877,609

(22) Filed: Jun. 25, 2004

(65) Prior Publication Data

US 2005/0289084 A1 Dec. 29, 2005

(51) Int. Cl.
*H04L 9/00* (2006.01)
(52) U.S. Cl. ........................ 713/156; 713/157
(58) Field of Classification Search .................. 713/156
See application file for complete search history.

(56) References Cited

U.S. PATENT DOCUMENTS

| | | | | |
|---|---|---|---|---|
| 5,870,550 | A * | 2/1999 | Wesinger et al. | 709/218 |
| 5,905,862 | A | 5/1999 | Hoekstra | |
| 5,983,351 | A | 11/1999 | Glogau | |
| 6,298,341 | B1 | 10/2001 | Mann et al. | |
| 6,308,275 | B1 * | 10/2001 | Vaswani et al. | 726/2 |
| 6,321,339 | B1 | 11/2001 | French et al. | |
| 6,519,589 | B2 | 2/2003 | Mann et al. | |
| 6,560,634 | B1 | 5/2003 | Broadhurst | |
| 6,647,422 | B2 * | 11/2003 | Wesinger et al. | 709/228 |
| 6,745,248 | B1 | 6/2004 | Gardos et al. | |
| 6,789,103 | B1 | 9/2004 | Kim et al. | |
| 6,880,007 | B1 | 4/2005 | Gardos et al. | |
| 6,888,836 | B1 * | 5/2005 | Cherkasova | 370/400 |
| 6,895,430 | B1 | 5/2005 | Schneider | |
| 7,003,661 | B2 * | 2/2006 | Beattie et al. | 713/156 |
| 7,114,177 | B2 * | 9/2006 | Rosenberg et al. | 726/4 |
| 7,120,929 | B2 * | 10/2006 | Beattie et al. | 726/6 |
| 7,386,880 | B2 * | 6/2008 | Wesinger et al. | 726/11 |

(Continued)

OTHER PUBLICATIONS

Oct. 30, 2007 Office Action in related U.S. Appl. No. 10/877,613.

(Continued)

*Primary Examiner*—Christian Laforgia
(74) *Attorney, Agent, or Firm*—Stewart J. Womack; Karl A. Fazio

(57) ABSTRACT

The present invention provides systems and methods for enabling encrypted communication capabilities for a Subscriber's Web Site, thereby allowing Customers to access the Subscriber's Web Site in a secure manner. The Subscriber may register a domain name associated with the Subscriber's Web Site using a proxy domain name service, thereby hindering its Customers ability to verify the owner of the Subscriber's Web Site. A Hosting Provider hosts the Subscriber's Web Site and a Certificate Authority (CA) verifies the identity of the Subscriber. In combination the Hosting Provider and CA provide the Subscriber's Web Site with Secure Sockets Layer (SSL) encrypted communications capability. The Hosting Provider and CA communicate directly with each other as needed, typically via the Internet, without using the Subscriber as an intermediary in their communications.

6 Claims, 5 Drawing Sheets

U.S. PATENT DOCUMENTS

| | | | |
|---|---|---|---|
| 7,448,079 B2* | 11/2008 | Tremain | 726/14 |
| 7,552,466 B2* | 6/2009 | Rosenberg et al. | 726/4 |
| 7,562,212 B2* | 7/2009 | Beattie et al. | 713/156 |
| 2001/0001877 A1 | 5/2001 | French | |
| 2001/0011304 A1* | 8/2001 | Wesinger et al. | 709/227 |
| 2001/0042050 A1* | 11/2001 | Fletcher et al. | 705/64 |
| 2001/0049786 A1* | 12/2001 | Harrison et al. | 713/156 |
| 2002/0035611 A1 | 3/2002 | Dooley | |
| 2002/0065903 A1 | 5/2002 | Fellman | |
| 2002/0069369 A1* | 6/2002 | Tremain | 713/201 |
| 2002/0091827 A1 | 7/2002 | King et al. | |
| 2002/0129013 A1 | 9/2002 | Thomas | |
| 2003/0005287 A1* | 1/2003 | Wray et al. | 713/155 |
| 2003/0023878 A1* | 1/2003 | Rosenberg et al. | 713/201 |
| 2003/0126431 A1* | 7/2003 | Beattie et al. | 713/156 |
| 2004/0044791 A1 | 3/2004 | Gardos et al. | |
| 2004/0049587 A1* | 3/2004 | Henaff et al. | 709/229 |
| 2004/0068460 A1 | 4/2004 | Feeley et al. | |
| 2004/0167982 A1 | 8/2004 | Cohen et al. | |
| 2004/0250075 A1* | 12/2004 | Anthe et al. | 713/175 |
| 2005/0015586 A1* | 1/2005 | Brickell | 713/156 |
| 2005/0102354 A1 | 5/2005 | Hollenbeck et al. | |

OTHER PUBLICATIONS

Apr. 10, 2008 Office Action in related U.S. Appl. No. 10/877,613.
Jul. 28, 2008 Office Action in related U.S. Appl. No. 10/877,613.
Dec. 29, 2008 Office Action in related U.S. Appl. No. 10/877,613.
Jun. 4, 2009 Office Action in related U.S. Appl. No. 10/877,613.
Oct. 15, 2009 Office Action in related U.S. Appl. No. 10/877,613.
Applicant's Jan. 9, 2008 Reply to Oct. 30, 2007 Office Action in related U.S. Appl. No. 10/877,613.
Applicant's May 14, 2008 Reply to Apr. 10, 2008 Office Action in related U.S. Appl. No. 10/877,613.
Applicant's Sep. 19, 2008 Reply to Jul. 28, 2008 Office Action in related U.S. Appl. No. 10/877,613.
Applicant's Mar. 10, 2009 Reply to Dec. 29, 2008 Office Action in related U.S. Appl. No. 10/877,613.
Applicant's Aug. 28, 2009 Reply to Jun. 4, 2009 Office Action in related U.S. Appl. No. 10/877,613.
Applicant's Dec. 8, 2009 Reply to Oct. 15, 2009 Office Action in related U.S. Appl. No. 10/877,609.
Feb. 9, 2010 Office Action in related U.S. Appl. No. 10/877,613.
Applicant's Feb. 9, 2010 Reply to Feb. 9, 2010 Office Action in related U.S. Appl. No. 10/877,613.

* cited by examiner

METHOD FOR A WEB SITE WITH A PROXY DOMAIN NAME REGISTRATION TO RECEIVE A SECURE SOCKET LAYER CERTIFICATE

CROSS REFERENCE TO RELATED PATENT APPLICATIONS

This patent application is related to the following patent application concurrently filed herewith, all assigned to The Go Daddy Group, Inc:

U.S. patent application Ser. No. 10/877,613, "AUTOMATED PROCESS FOR A WEB SITE TO RECEIVE A SECURE SOCKET LAYER CERTIFICATE."

FIELD OF THE INVENTION

The present invention relates to methods for providing a secure socket layer (SSL) certificate to a Web site, possibly associated with a proxy domain name registration, in order to provide encrypted communications capability and to allow verification of the identity of the owner of the Web site.

BACKGROUND OF THE INVENTION

The Internet is a global network of interconnected computers that allows individuals and organizations around the world to communicate and to share information with one another. The World Wide Web (WWW), also known as the Web, is a collection of information resources contained in documents located on individual computers around the world and is one of the fastest growing parts of the Internet. Prevalent on the Web are multimedia Web sites offering and selling goods and services to individuals and organizations, i.e. Customers. Web sites may consist of a single Web page, but typically consist of multiple interconnected and related Web pages.

Each computer or server on the Internet is assigned a unique identifier known as an Internet Protocol (IP) address. A computer or server may host one or more Web sites. IP addresses are difficult to remember so a domain name service (DNS) associates Web sites' IP addresses with their corresponding domain names. This permits a Customer to enter an easily remembered domain name into a browser, and the browser, via the DNS, locates the unique IP address and thus the location of the Web site. Another advantage of the DNS is that the Web site may move its physical location on the Internet, i.e. receive a new IP address, but by making the appropriate changes in the DNS, the Web site may still be located using the original domain name.

In certain situations, the registrant of a domain name may not want to have their personal contact information made publicly available to prevent spam, identity theft, harassment, etc. from occurring. A proxy domain name registration permits a registrant to register a domain name anonymously by requesting the proxy to use the proxy's contact information so that the contact information published in the WHOIS database (a publicly accessible database of domain names and their corresponding registrants) is that of the proxy entity.

Internet businesses, whether a large corporation or an individual, are rapidly creating Web sites to take advantage of the growing number of Customers using the Internet and Customers' increasing willingness to purchase goods and services over the Web. Web sites created by Internet businesses may be reached by millions of Internet savvy Customers, thereby allowing Internet businesses to offer their products and services to a very large pool of potential Customers.

Some Internet businesses, typically larger more sophisticated ones, may provide their own hardware, software and connections to the Internet. However, many Internet businesses either do not have the resources available or do not want to create and maintain the infrastructure necessary to host their own Web sites. To assist these Internet businesses in operating their Web sites, many companies are offering hosting services for Web sites. These hosting companies typically provide the hardware, software and electronic communication means necessary to connect multiple Internet businesses' Web sites to the Internet. A single hosting company may literally host thousands of Web sites.

An unfortunate consequence of the Internet's growth is the accompanying growth of fraud on the Internet. Fraud not only results in actual losses, but it hinders the growth of the Internet. Many potential Customers may avoid conducting business over the Internet due to their fear of being deceived or of compromising personal data.

There are many fraudulent schemes, but two types of fraud tend to be particularly worrisome for Customers. The first type of fraud involves the operator of a Web site hiding or obscuring their identity from their Customers. Basically, the operator of a Web site takes advantage of the anonymity provided by the Internet thereby making it difficult for Customers to locate and punish a fraudulent Web site operator. For example, a Web site may purport to be from a known and trusted business when the Web site is in fact operated by an unscrupulous individual. The unscrupulous individual may try to receive credit card numbers or pass off goods and services under another's trademark as part of their fraudulent scheme.

The unscrupulous individual may have inserted false information in the WHOIS database when they registered their domain name to hide their identity. This is possible because Registrars do not verify the identity of a domain name registrant at the time domain names are registered. The unscrupulous individual may also try to use a proxy domain name registration. While most proxy domain name registrations are used for legitimate purposes, unscrupulous individuals may try to use this approach to make it more difficult for Customers to learn their identity, because the proxy's contact information, and not the unscrupulous individual's contact information, is made publicly available in the WHOIS database. As a consequence, legitimate businesses that wish to use a proxy domain name registration have a particularly urgent need for assuring their Customers that their identities are known and have been verified.

The second type of fraud involves individuals intercepting confidential information, such as credit card numbers, transmitted over the Internet between a Customer and a legitimate Web site. This type of fraud is much less common and may easily be prevented by transmitting confidential information only in a sufficiently strong encrypted format.

A common method for Internet businesses to protect their Customers from these two types of fraud is to obtain a Secure Sockets Layer (SSL) Certificate for their Web sites. An SSL certificate on a Web site lets Customers know that the owner of the Web site has been verified by a trusted third party (Certificate Authority or CA) and that confidential communications with the Web site are encrypted. SSL includes a protocol for transmitting private documents via the Internet. SSL protects confidential information by using a private key to encrypt data transferred over an SSL connection. Common conventional browsers, such as NETSCAPE NAVIGATOR and INTERNET EXPLORER, support the SSL protocol, and many Web sites use the protocol to obtain confidential user information from their Customers. By convention, Uniform Resource Locators (URLs) that require an SSL connection start with "https:" instead of "http:".

When connecting to a Web site using the SSL protocol, the Customer's browser receives information regarding the CA that issued the Web site's SSL certificate. The browser may decide whether or not to trust the Web site's SSL certificate based on which CA issued the Web site's SSL certificate. If the CA is on the browser's list of trusted CAs, the browser will know that the owner of the Web site has met the trusted CA's process for receiving an SSL certificate.

A conventional process for a CA to issue an SSL certificate to a requesting Subscriber for the Subscriber's Web site is illustrated in FIGS. 1 and 2. The process starts with a Subscriber 150, typically the owner or an agent for the Web site 180, requesting hosting services from a Hosting Provider 160, typically in cooperation with an Internet Service Provider (ISP) (Step 200). The Hosting Provider 160 will typically provide the hardware and software necessary to place the Subscriber's Web Site 180 on the Internet. The Subscriber 150 may decide to request SSL services for its Web Site 180 from the Hosting Provider 160 to provide assurances to its customers that the Subscriber 150 is who the Subscriber 150 says it is and to enable encrypted communications with the Subscriber's customers. (Step 201)

The Hosting Provider 160 generates a public and a private key for the Subscriber's Web Site 180 (Step 202). The keys, as is known in the art, are integral to encrypted communications capabilities between the Customer and Subscriber's Web site. The Hosting Provider 160 generates a Certificate Signing Request (CSR) which includes information regarding the public key and a distinguished name, i.e., a unique name conforming to a standardized format. (Step 203) The Hosting Provider 160 transmits the CSR to the Subscriber 150. (Step 204)

Once the Subscriber 150 has the CSR, the Subscriber 150 may request an SSL certificate from a Certificate Authority 170 (CA) (Step 205) and start the process by transmitting the CSR to the CA 170 (Step 206). The CA 170 will normally be required to verify the identity of the Subscriber 150 by, for examples, asking for copies of identification documents or by asking for information not publicly available regarding the Subscriber 150. (Step 207) If the identity of the Subscriber 150 was verified, the CA 170 will create and sign an electronic Certificate. (Step 208) The CA 170 will transmit the electronic Certificate to the Subscriber 150 (Step 209) and the Subscriber 150 will transmit the Certificate to the Hosting Provider (Step 210). The Hosting Provider will install and configure the Certificate on the Subscriber's Web Site 180 thereby enabling the Subscriber's Web Site 180 to communicate using the SSL protocol. (Step 211) The Subscriber's Web Site 180 is now SSL complaint and may be accessed by customers desiring the extra security provided by the SSL protocol.

A third party, such as a customer desiring to purchase goods and services from the Subscriber 150, may use a browser to access the Subscriber's SSL compliant Web Site 180. Several steps are automatically performed by the browser without any interaction by the customer and, in fact, the customer may not even know the browser is performing these steps. The browser will request from the Subscriber's Web Site 180 the Certificate to the Web Site 180, which includes the identity of the CA that issued the Certificate. Browsers that support the SSL protocol have a list of trusted CAs and the browser will compare the CA that issued the Certificate to the Subscriber's Web Site's 180 with the browser's list of trusted CAs. If no match is found, the browser may try to see if it can get a match to one of its trusted CAs by "chaining" the CA that issued the Certificate to the Subscriber's Web Site.

The chaining process involves the browser looking at a first CA that issued the Certificate to a second CA that in turn issued the Certificate to the Subscriber's Web Site. By moving up the chain of issuing CAs the browser will attempt to eventually link up to the root CA. This process is helpful since the root CA is more likely to be on the browser's list of trusted CAs. If a match between a CA in the chain and a CA on the browser's list of trusted CAs is eventually found, the process for setting up an SSL connection may continue. If no match is found, i.e. the browser is unable to verify the owner of the Subscriber's Web Site 180 per the SSL protocol, the browser will typically display a security error to the user and ask if they would like to disconnect from the Web Site or ignore the error and continue.

The browser will need to get the public key from the Hosting Provider for the Subscriber's Web Site 180. Hosting Providers freely give the public key to anybody that asks for it. The browser may also request from the CA its Certificate Revocation List (CRL) to see if the Subscriber's Web Site's 180 Certificate has been revoked. Obviously, if the Subscriber's Web Site 180 has had its Certificate revoked by its CA, the browser may wish to refuse to establish an SSL link with the Subscriber's Web Site 180.

The SSL process allows the Subscriber's Web Site 180 and the Customer to authenticate each other through an established "hand-shaking" procedure and allows both to establish an encrypted connection. Various levels of encryption are known and may be used as appropriate once a connection has been made. For example, non-confidential information may not even be encrypted or may be encrypted with a simple cipher thereby conserving computer resources, while highly-confidential information, such as credit card numbers, may be encrypted with very sophisticated encryption algorithms to increase the security in the transmittal of the data.

The integrity of the system relies on the fact that the Hosting Provider 160 that hosting the Subscriber's Web Site 180 has maintained control over the private key at all times since the Hosting Provider 160 originally created both keys. This allows the Hosting Provider 160 to use known key-pair encryption technologies with a great deal of confidence in the security of the encryption process since the Hosting Provider 160 is able to insure that the Hosting Provider 160 is the only party to ever have access to the private key.

A problem with the prior art method of obtaining an SSL certificate for a Web site is that it involves a great deal of action by the Subscriber. Specifically, after the Subscriber requests hosting and SSL services from a Hosting Provider, the Subscriber must receive the CSR from the Hosting Provider and transmit the CSR to the CA and the Subscriber must receive the Certificate from the CA and transmit the Certificate to the Hosting Provider. If the Subscriber fails in coordinating the transmission of either the CSR or the Certificate between the Hosting Provider and the CA, the Subscriber's efforts in making their Web site SSL enabled will fail. Compounding the problem is the fact that few Subscribers are familiar with the process for obtaining an SSL Certificate for their Web site and would prefer to focus on the issues with their core business.

New systems and processes are therefore needed to prevent fraud on the Internet that overcome the limitations of current methods. Specifically, systems and processes are needed to simplify the process for a Subscriber to make their Web site SSL enabled. SSL enabled Web sites help fight against fraud by having a trusted third party verify the identity of a Web site operator and by encrypting communications between the Subscriber's Web Site and its Customers. Using an SSL enabled Web site is particularly important for Subscribers that have used a proxy service in registering their domain name since a proxy service makes it more difficult for Customers to verify the identity of the Web site operator on their own.

SUMMARY OF THE INVENTION

Additional advantages and aspects of the present invention will become apparent in the following detailed description of the invention and the claims.

The invention provides systems and methods for a Subscriber to simply and easily improve the security of the communications between its Web site and its Customers. In a preferred embodiment, the Subscriber's Web Site will become SSL enabled as the means for improving the Web site's security although other protocols, particularly those that use public and private key encryption algorithms, may also be used. The Subscriber will need to acquire, typically by registering with a Registrar, a domain name that, via the DNS, may be used to access the Subscriber's Web Site.

In a preferred embodiment, the Subscriber registers a domain name for their Web site using a proxy service whereby the proxy's contact information is stored in the publicly available WHOIS database. The invention includes a Hosting Provider for hosting the Subscriber's web site and a Certificate Authority (CA) for verifying the identity of the Subscriber. Advantageously, the Hosting Provider and CA may communicate directly with each other, as opposed to prior art methods that used the Subscriber as an intermediary during their exchange of information.

In an exemplary process, the Subscriber registers a domain name and may, if the Subscriber desires to keep their contact information confidential, register the domain name using a proxy domain name registration. The Subscriber may request hosting services for the Subscriber's Web Site from a Hosting Provider. At the time the Subscriber requests hosting services, or at any time thereafter, the Subscriber may request SSL services for its Web site from either the CA or from the Hosting Provider.

If the request for SSL services was made to the CA, the CA may request a Certificate Signing Request (CSR) from the Hosting Provider. If the request for SSL services was made to the Hosting Provider, the Hosting Provider may automatically create the CSR. To maximize the efficiencies of the invention, the Hosting Provider and CA preferably communicate directly with each other during the rest of the process without having to rely on the Subscriber as an intermediary.

The Hosting Provider may generate a key pair, i.e. a public key and a private key, according to Public-Key Infrastructure (PKI) techniques that are well known in the art. The Hosting Provider may transmit the created CSR to the CA. The CA may verify the identity of the Subscriber by, for examples, asking for identification documents or asking questions and verifying the answers using on-line databases. Information that may have been provided to the Hosting Provider may also be used to verify the identity of the Subscriber. The CA plays the role of a trusted third party that verifies the identity of the Subscriber and distributes the Subscriber's public key to anybody that requests it. Once the Subscriber's identity has been verified, the CA may electronically create and sign a Certificate. The CA may directly transmit the Certificate to the Hosting Provider and the Hosting Provider may then install and configure the Certificate on the Subscriber's Web Site.

The Subscriber's Web Site is now SSL enabled and Customers may purchase goods and enjoy secure communications with the Subscriber's Web Site using the SSL protocol.

It should be understood that the Hosting Provider and CA may be separate where each Hosting Provider may be able to communicate with a plurality of different CAs and each CA may be able to communicate with a plurality of different Hosting Provider's over the Internet. This allows the Subscriber the flexibility to match any Hosting Provider with any CA that the Subscriber wants to use as long as the Hosting Provider and the CA are set-up in accordance with the present invention.

In another embodiment, the Hosting Provider and CA may also be functions in a Facilitator's Web Server. The functions may include hardware and software necessary to perform the particular tasks of a Hosting Provider and CA respectively. This approach greatly simplifies and speeds up the communications between the Hosting Provider and the CA since they may both reside, as non-limiting examples, on a local computer network or an Intranet, and thus may be highly integrated with each other. Whether the Hosting Provider and CA are separate or fully integrated with each other, the Hosting Provider and CA may communicate directly with each other without the need for the Subscriber to act as an intermediary in transferring information.

DETAILED DESCRIPTION OF THE PREFERRED EMBODIMENTS

Figure 1:
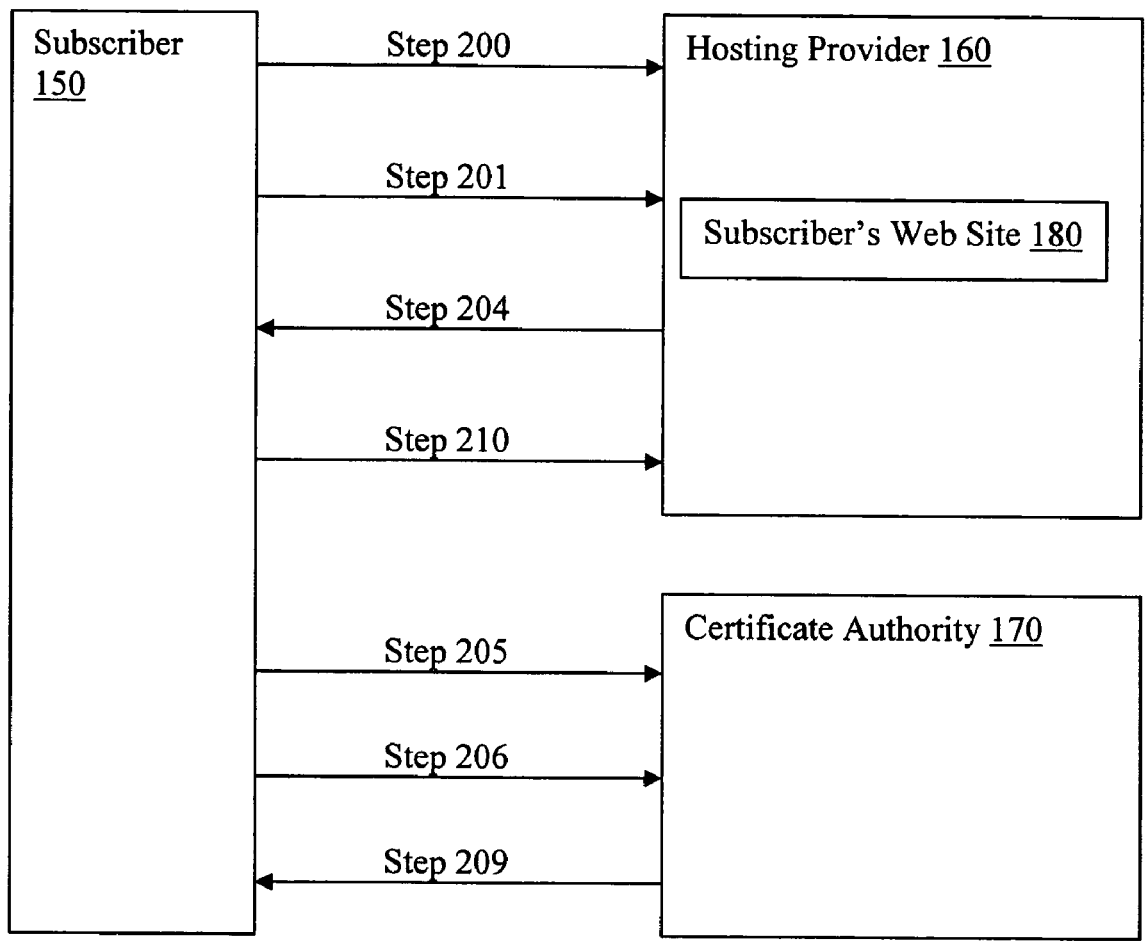
FIG. 1 is a block diagram illustrating the communication paths used in prior art methods to provide a Subscriber's Web Site with SSL capabilities.
Figure 2:
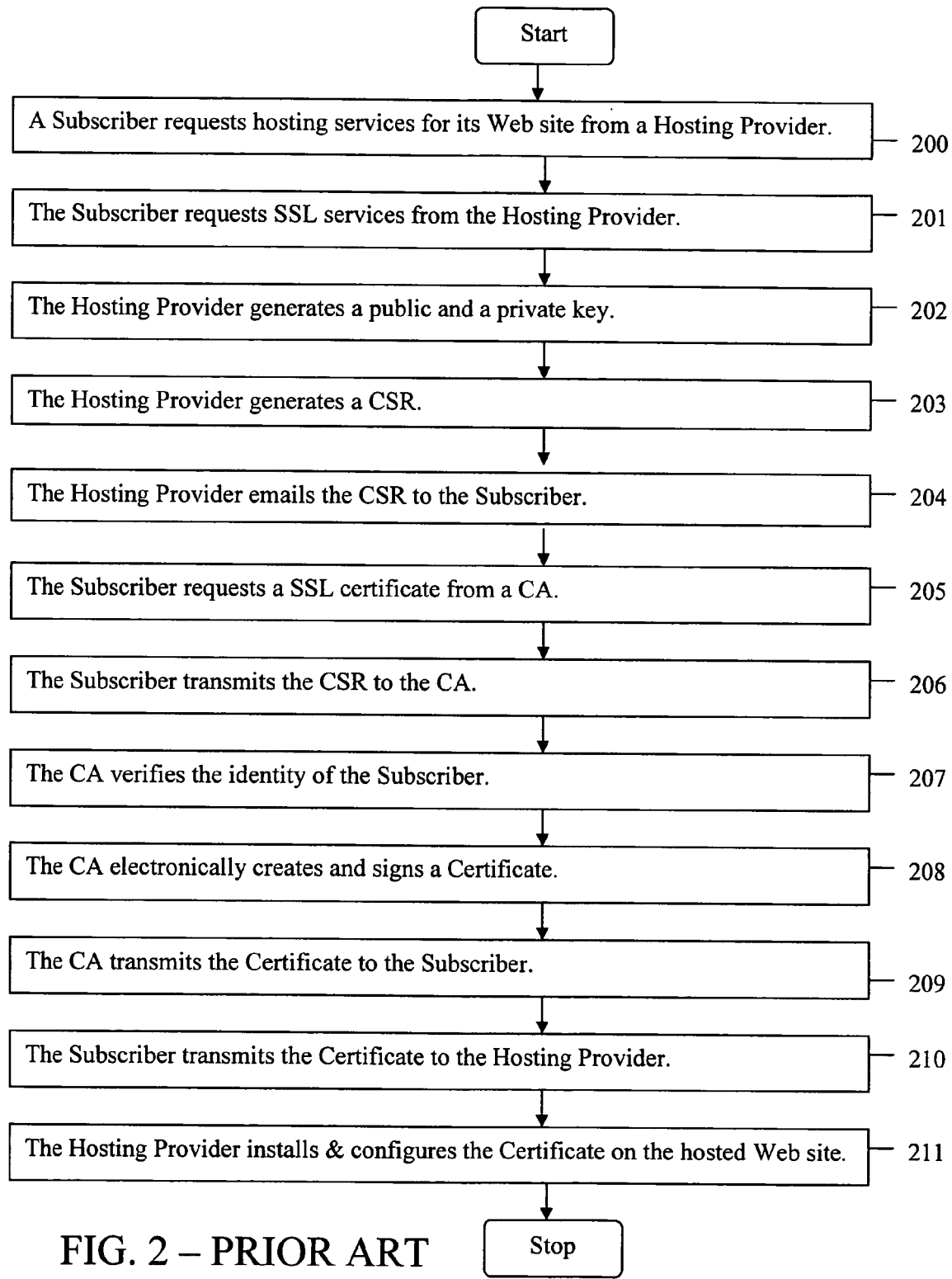
FIG. 2 is a flow chart illustrating a prior art method for providing a Subscriber's Web Site with SSL capabilities.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

As the Internet grows, fraud grows with it. Fraud not only results in actual losses, but it deters further growth of the Internet. A percentage of potential Internet Customers won't shop on-line out of fear of being a victim of fraud. The potential Customers fear a lack of security on the Internet will compromise their personal data, like email addresses and credit card numbers. Web sites that are able to remove potential Customers' fear of fraud will be at a competitive advantage compared to Web sites that are not able to effectively handle potential Customers' fear. The present invention is designed to help remove the fear Customers have in disclosing confidential information over the Internet by providing real security measures to their Internet communications. An advantage of the present invention over the prior art is that a Subscriber may more easily add security features to its Web site since the Hosting Provider and CA are able to directly communicate with each other. The invention is not limited to any particular communication medium, but the communication preferable occurs over the Internet.

The general features used in practicing the invention and their interrelationships will be discussed with reference to FIGS. 3 and 4. The invention provides a method for a Subscriber 150 to improve the security of the communications between the Subscriber's Web Site 180 and its Customers. Customers will typically be connected to the Subscriber's Web Site 180 from their personal computers via the Internet. In a preferred embodiment, the Subscriber's Web Site 180 will become SSL enabled as the means for improving the Subscriber's Web Site's security, although other protocols, particularly those that use public and private key encryption algorithms, may also be used with the present invention.

The Subscriber 150 may acquire a domain name by registering a desired domain name with a Registrar. For example, the Subscriber 150 may register a domain name using Go Daddy Software, Inc. by visiting their Web site at www.godaddy.com. As part of the domain name registration process or management, the Subscriber 150 may associate, via the DNS, the domain name with a Web site they have created. This allows Customers to easily access the Subscriber's Web site via the domain name using conventional browsers. The processes of registering domain names, creating Web sites, pointing domain names to particular Web sites via the DNS and accessing Web sites with browsers using domain names are all well known by those skilled in the art.

As part of the domain name registration process, the Subscriber 150 may register the domain name using a proxy service offered by the Registrar (Step 400). A proxy service allows the Subscriber 150 to register and have legal rights to the domain name, while allowing the proxy service to insert its contact information in the publicly accessible WHOIS database. Proxy domain name registrations may be obtained, for example, from Domains By Proxy, Inc. at www.domainsbyproxy.com. Further information may be obtained regarding proxy domain name registrations through U.S. Pat. No. 7,130,878 titled "SYSTEMS AND METHODS FOR DOMAIN NAME REGISTRATION BY PROXY" issued on Oct. 31, 2006, which is hereby incorporated by reference.

While a proxy service protects the Subscriber's personal contact information from people who may want to use it for inappropriate purposes, such as identity theft or spamming, it also blocks Customers from personally verifying the identity of the Subscriber 150 through the use of the publicly available WHOIS information. Thus, Subscribers 150 that use proxy domain name registrations have a heightened need for reassuring their Customers that they are who they say they are since the Customer may be passing confidential information, such as personal contact information or credit card numbers, to the Subscriber 150. For this reason, it is particularly valuable for a Web site with a proxy domain name registration to be SSL enabled, as this lets the Subscriber's Customers know that a trusted third party has verified the identity of the Subscriber 150.

The Subscriber 150 may request and receive hosting services from a Hosting Provider 360 for the Subscriber's Web Site 150 (Step 401). Such services may be obtained by contacting the Hosting Provider, for example, by logging onto a Hosting Provider's Web Site. One such Hosting Provider is Go Daddy Group, Inc. with a Web site located at www.godaddy.com.

The Subscriber 150 may request SSL services for the Subscriber's Web Site 180 either from a CA 370 or from its Hosting Provider 360 (Step 402). If the request for SSL services was made to the CA 370, the CA 370 may request a Certificate Signing Request (CSR) from the Subscriber's Hosting Provider 360 (Step 403). To maximize the efficiencies of the invention, the Hosting Provider 360 and CA 370 preferably communicate directly with each other during the rest of the process without having to rely on the Subscriber 150 as an intermediary.

The Hosting Provider 360 may generate a key pair, i.e. a public key and a private key, according to Public-Key Infrastructure (PKI) techniques known in the art (Step 404). The Hosting Provider 360 uses the private key and the Subscriber's Customers use the public key to permit encrypted communications between the Subscriber's Web Site 180 and its Customers.

The Hosting Provider 360 may also generate a Certificate Signing Request (CSR) which may include the public key and a unique name, commonly known as a distinguished name in the art, for the Subscriber's Web Site 180 (Step 405). For maximum security and integrity of the system, the Hosting Provider 360 should never reveal the private key and maintain the private key in strict confidence.

In contrast with prior art methods, the Hosting Provider 360 and CA 370 may communicate directly with each other during the remaining portions of the process without having to rely on the Subscriber 150 as an intermediary in communicating information. The Hosting Provider 360 may transmit the CSR to the CA 370 (Step 406).

The CA 370 may verify the identity of the Subscriber 150, for example, by asking the Subscriber 150 for identification documents or by asking the Subscriber 150 questions and verifying the answers using on-line databases (Step 407). The CA 370 may contact the Subscriber 150 directly, possible either via e-mail or by having the Subscriber 150 link to the CA's Web site. Another alternative is for the Hosting Provider 360 to pass questions or document requests from the CA 370 to the Subscriber 150 and then facilitate the transfer of the answers or documents from the Subscriber 150 to the CA 370.

Asking for identification documents via mail or even fax will slow the process down, but may provide a strong document based identification process. Asking for answers available in on-line databases produce identifications much faster, but typically at the expense of being less reliable. The identification process is preferably done as thoroughly as possible so that Customers may rely and trust that the Subscriber 150 has been properly identified by the CA 370 and the Subscriber 150 is whom the Subscriber 150 claims to be. The advantage of a fast verification process is that the Subscriber's Web Site 180 will be on-line and available for business sooner.

The CA 370 plays the role of an impartial trusted third party authority that verifies the identity of the Subscriber 150. Once the Subscriber's 150 identity has been verified, the CA 370 may electronically create and sign a Certificate (Step 408). Obviously, if the CA 370 is unable, possibly after several attempts using different methodologies, to verify the identity of the Subscriber 150, the process will be terminated and the Subscriber's Web Site 180 will not receive the benefits of having encrypted communications capability. The CA 370 may also create and distribute a Certification Revocation List to keep track of Certificates that are no longer valid. The CA 370 may transmit this list to anybody that asks for it.

After the Subscriber's 150 identity has been verified by the CA 370, the CA 370 may directly transmit the Certificate to the Hosting Provider 360 (Step 409) and then the Hosting Provider 360 may install and configure the Certificate on the Subscriber's Web Site 180 (Step 410). The Subscriber's Web Site 180 is now SSL enabled and Customers may purchase goods and services from the Subscriber's Web site 180 and benefit from secure communications with the Subscriber's Web Site 180 using the SSL protocol.

In a preferred embodiment, the CA 370 is a root Certificate Authority that is recognized by the most commonly used browsers. In another embodiment, the CA 370 may be linked, possible via several intermediate Certificate Authorities, to a Certificate Authority that is widely recognized by the most commonly used browsers. Thus, the CA 370 may be a single root SSL, i.e. the CA is directly recognized by most browsers, or a chained root SSL, i.e. the CA inherits its certification from another CA. The CA 370 may be several levels from a root CA. If the CA 370 is not recognized or is not linked to a Certificate Authority that is recognized by a browser, the browser preferably warns the Customer and either terminates the communications or allows the Customer the option to terminate or continue using the SSL protocol. Thus, it is important for the CA 370 to be widely recognized by commonly used browsers or to be "chained" or linked to a Certificate Authority that is widely recognized by commonly used browsers.

In another embodiment of the invention, the Hosting Provider 360 and CA 370 operate from different servers or computer networks that preferably can communicate directly with each other, for example over the Internet, as described in this invention. In practice, there may be many Hosting Providers and CAs available for Subscribers to use. This allows the Subscriber 150 the flexibility to match any Hosting Provider 360 with any CA 370 that the Subscriber 150 wants to use as long as the Hosting Provider 360 and the CA 370 are set-up to communicate with each other and perform the processes in accordance with the present invention.

Figure 3:
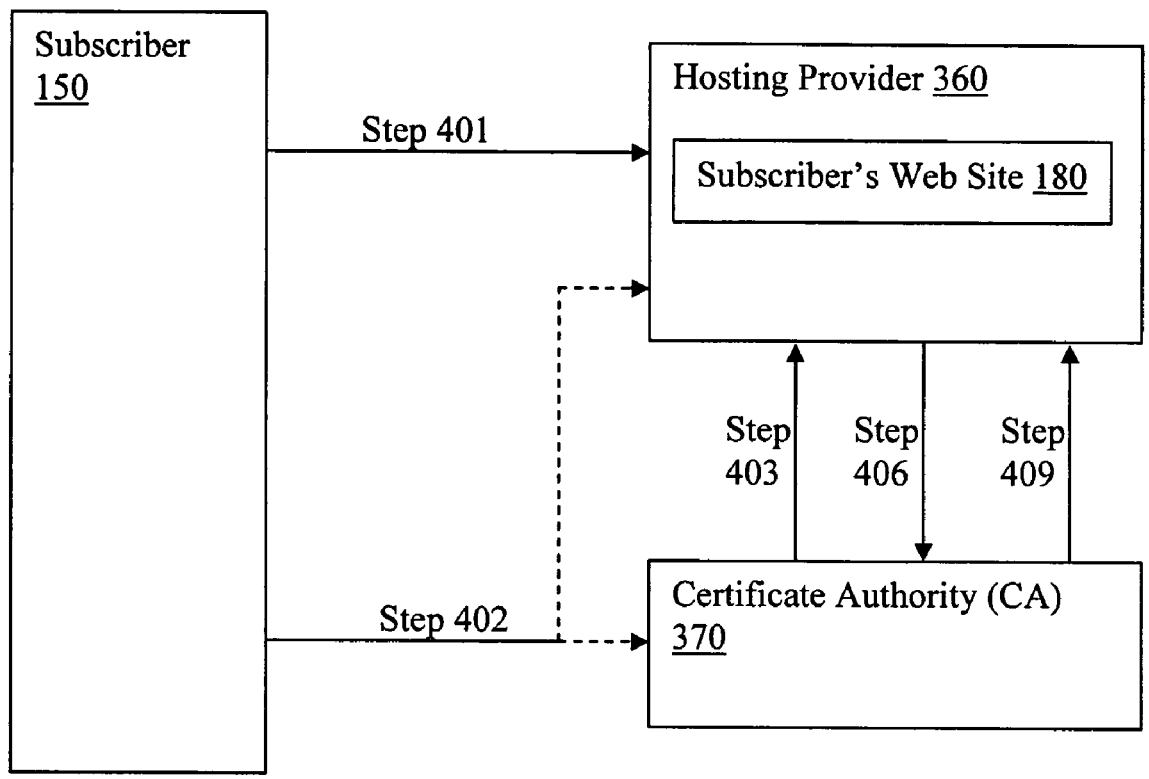
FIG. 3 is a block diagram illustrating the communication paths used in a first embodiment of the invention to provide a Subscriber's Web Site with secure communications.
Figure 4:
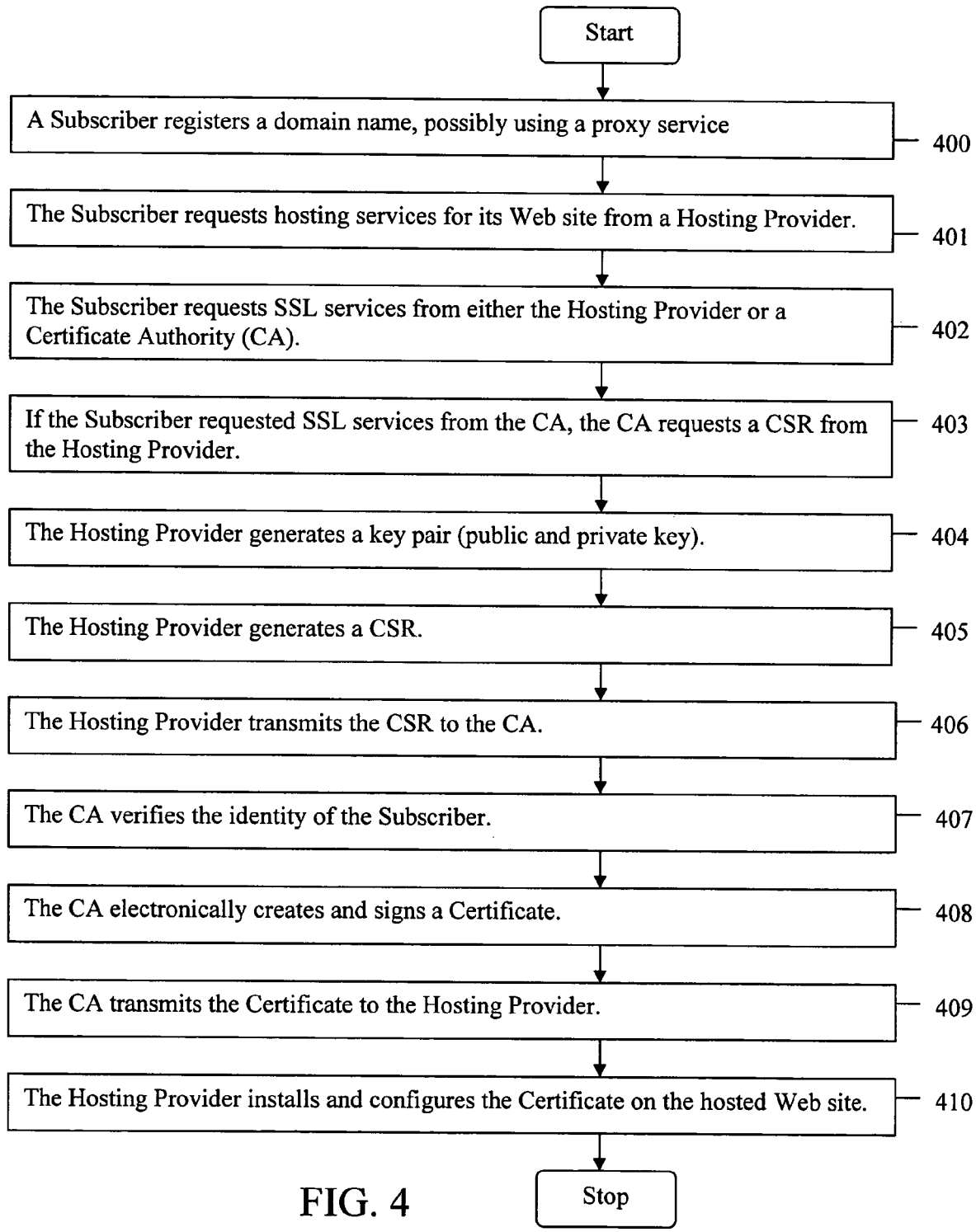
FIG. 4 is a flow chart illustrating a first method for providing a Subscriber's Web Site with SSL capabilities.
Figure 5:
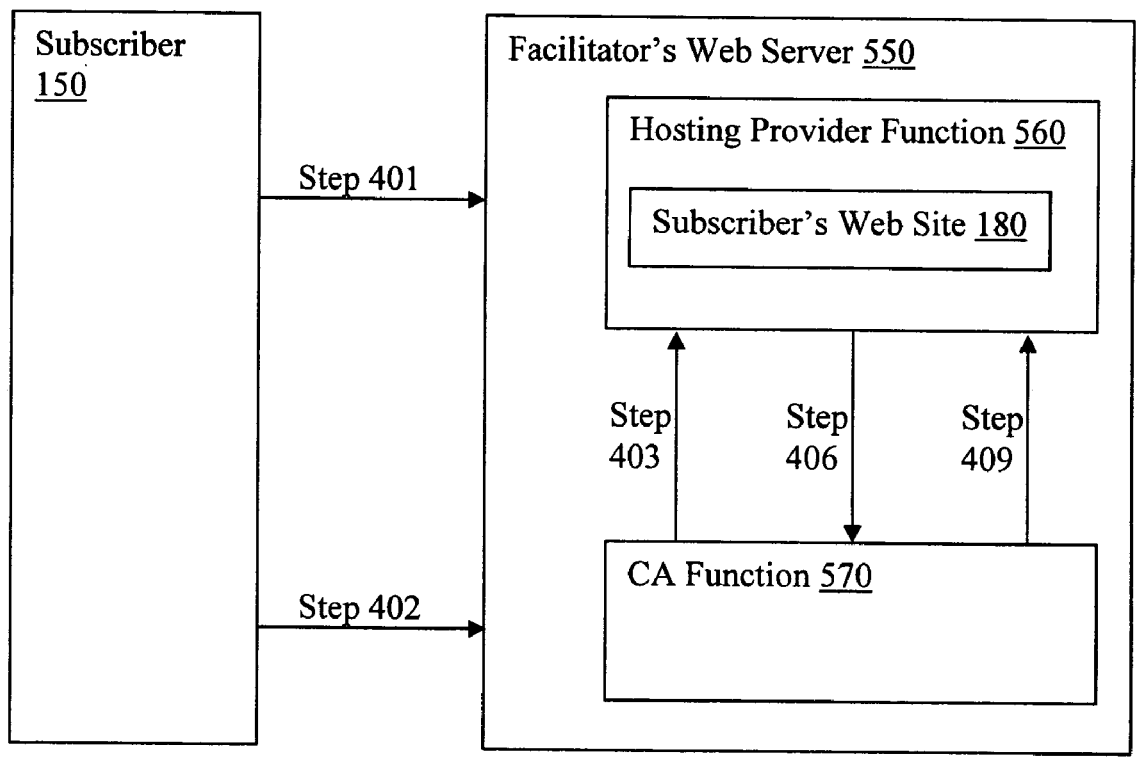
FIG. 5 is a block diagram illustrating the communication paths used in a second embodiment of the invention to provide a Subscriber's Web Site with secure communications.

In yet another embodiment of the invention, as generally illustrated in FIG. 3, a Hosting Provider Function 560 and a CA Function 570 may reside on a single Facilitator's Web Server 550. In this approach the Hosting Provider Function 560 and the CA Function 570 perform the tasks previously disclosed for the Hosting Provider and the CA respectively. This embodiment greatly simplifies the communication process between the Hosting Provider Function 560 and the CA Function 570 since both Functions may be performed on a single server or local computer network and thus may be highly integrated with each other. They may share software and hardware resources and even be integrated into the same software and hardware system.

It should be noted for this patent that all references, whether in the specification or claims, to the Subscriber requesting services from the Hosting Provider, CA or Facilitator's Web Server include the embodiments of the Subscriber requesting these services directly, through an agent or through a Reseller to the service provider. Resellers are particularly advantageous in that they provide another marketing channel for the services of the Hosting Provider, CA or Facilitator's Web Server without increasing the complexity of the overall process for the Subscriber. Specifically, a Reseller may collect fees and information from the Subscriber and then permit, assist or proceed with the above described processes for the benefit of the Subscriber.

In view of the foregoing, it will be understood by those skilled in the art that the systems and processes of the present invention can facilitate a secure communication protocol for a Subscriber's Web Site. The above-described embodiments have been provided by way of example, and the present invention is not limited to these examples. For example, while the SSL protocol was disclosed in some detail, other encryption protocols may also be used with the present invention. It should be noted that the present invention can be extended to a plurality of Subscribers.

Multiple variations and modification to the disclosed embodiments will occur, to the extent not mutually exclusive, to those skilled in the art upon consideration of the foregoing description. For example, not all steps are required to be performed in the order disclosed and in fact some steps may be skipped altogether in certain embodiments of the invention. Such variations and modifications, however, fall well within the scope of the present invention as set forth in the following claims.

What is claimed is:

1. A method, comprising the steps of:
a) receiving, by a Certificate Authority, a request for a Secure Sockets Layer Certificate for a Web Site resolving from a domain name registered using proxy contact information and hosted by a Hosting Provider that provides a plurality of hardware and software necessary to place said Web Site on the Internet, said request being received from an owner of said Web Site;
b) requesting, by said Certificate Authority responsive to receiving said request for said Secure Sockets Layer Certificate from said owner of said website, a Certificate Signing Request directly from an entity that is different than said owner of said Web Site that transmitted said request for a Secure Sockets Layer Certificate to said Certificate authority in Step a), wherein said entity comprises said Hosting Provider;
c) receiving, by said Certificate Authority, a Certificate Signing Request directly from said Hosting Provider, said Certificate Signing Request comprising a public key and a distinguished name for said Web Site, said public key comprising part of a key pair generated by said Hosting Provider according to Public-Key Infrastructure protocol;
d) verifying, by said Certificate Authority, the identity of said subscriber;
e) upon successful verification of the identity of said owner of said Web Site, creating and signing, by said Certificate Authority, said Secure Sockets Layer Certificate; and
f) transmitting, by said Certificate Authority, said Secure Sockets Layer Certificate directly to said Hosting Provider for installation on said Web Site, wherein Steps b) through f) are accomplished without said owner of said Web Site being contacted by said Certificate Authority or said Hosting Provider.

2. The method of claim 1, wherein said Hosting Provider and said Certificate Authority are operated by a common Facilitator's Web Server.

3. The method of claim 1, wherein said Hosting Provider and said Certificate Authority are operated on separate servers.

4. The method of claim 1, wherein said Certificate Authority verifies the identity of said owner of said Web Site by comparing responses from said owner with information available from information services available over the Internet.

5. The method of claim 1, wherein said Certificate Authority is a root Certificate Authority.

6. The method of claim 1, wherein said Certificate Authority is linked to a root Certificate Authority.

* * * * *